United States Patent Office 2,831,902
Patented Apr. 22, 1958

2,831,902

SEPARATION OF 2-FLUOROPROPENE

Dallas E. Hamilton, Lake Jackson, and Thomas J. Cogdell, Freeport, Tex., assignors to The Dow Chemical Company, Midland, Mich., a corporation of Delaware No Drawing. Application January 18, 1957
Serial No. 634,811

8 Claims. (Cl. 260—653)

This invention relates to a method of separating the individual components from a low boiling mixture, and is more particularly concerned with a method of separating 2-fluoropropene from a mixture containing other low boiling components.

A method of reacting hydrogen fluoride with methylacetylene has been used to prepare 2-fluoropropene. Depending on the particular catalyst used, varying quantities of propadiene and 2,2-difluoropropane are also prepared. A reaction mixture containing methylacetylene (boiling at —23.5 degrees centigrade), hydrogen fluoride (boiling at 19.5 degrees centigrade), propadiene (boiling at —32.5 degrees centigrade), 2,2-difluoropropane (boiling at —0.5 degrees centigrade) and 2-fluoropropene (boiling at —24 degrees centigrade) is thus provided. By varying the type of catalyst used, it is possible to vary the proportions of the products obtained in the reaction product, but no method is presently known which will prepare 2-fluoropropene without these by-products, at least when using methylacetylene and hydrogen fluoride as the starting materials. Because the boiling points are relatively close together, fractional distillation of all the reaction products does not result in a sharp fractional separation of the components, but gives mixtures which are difficult to separate.

Unexpectedly, it has been found that 2-fluoropropene and propadiene will form azeotropes with ammonia. These azeotropes have very sharp boiling points and therefore may be utilized to separate the components of the reaction product. Also unexpectedly, the azeotropes after distillation and condensation will form two layers, thereby allowing a ready method of purification of the desired products. By utilizing the formation of these azeotropes, it is possible to get a relatively sharp fractionation of the reaction components even though the boiling points of the materials are relatively close together. And, settling and separating the resulting layers of the individual components results in relatively pure products being obtained.

Whereas ammonia boils at —33.4 degrees centigrade, and 2-fluoropropene boils at —24.0 degrees centigrade, a mixture of the two materials will form an azeotrope boiling from —41 to —40.2 degrees centigrade. This azeotrope has a composition of 66 percent 2-fluoropropene and 34 percent ammonia. When cooled to a temperature below —41 degrees centigrade, this azeotrope will form two layers, the upper layer containing 88 percent ammonia and 12 percent 2-fluoropropene and the lower layer containing 5 percent ammonia and 95 percent 2-fluoropropene. It has also been found that propadiene and ammonia form an azeotrope, distilling at —45 degrees centigrade, which has a composition of 44.3 percent ammonia, 55.7 percent propadiene, and which also will form two layers at temperatures below the azeotrope boiling point, the upper layer containing 13 percent propadiene, and 87 percent ammonia, while the lower layer contains 45 percent propadiene and 55 percent ammonia. It has previously been known that methylacetylene and ammonia form an azeotrope boiling at —35 degrees centigrade, containing 75 percent ammonia. The fact that, unexpectedly, 2-fluoropropene forms an azeotrope makes it possible to separate this material from materials having approximately the same boiling points. All weights recited herein are weight percent unless otherwise noted and the boiling points are given at atmospheric pressure.

The following examples are given to illustrate the mixture and process of the present invention, but are not to be construed as limiting.

*Example I*

A reactor equipped with a preheater, an effluent scrubbing unit and a Dry Ice-acetone trap and containing cobaltous chloride ($CoCl_2$) absorbed on F-10 Alumina (active alumina obtained from Aluminum Company of America) catalyst therein was provided. A mixture having a mole ratio of 1.4 to 1.0 of anhydrous hydrogen fluoride and methylacetylene was passed into the reactor maintained at 415 degrees centigrade, there being a contact time of 5 seconds. The reactor effluent was scrubbed with water, dried and condensed in the Dry Ice-acetone trap. There was thus obtained a 97 percent HF utilization and a reaction product containing 6 percent methylacetylene, 1 percent propadiene, 37 percent 2,2-difluoropropane and 56 percent 2-fluoropropene.

*Example II*

A mixture of 66 percent by weight of 2-fluoropropene (36 mole percent) and 34 percent by weight of ammonia (64 mole percent) was fed into a low temperature distillation unit. An azeotrope formed which distilled from —41 to —40.2 degrees centigrade and the condensate when collected separated into two layers: an upper layer containing 88 percent (96 mole percent) ammonia, and 12 percent (4 mole percent) 2-fluoropropene and a lower layer containing 5 percent (16 mole percent) ammonia and 95 percent (84 mole percent) 2-fluoropropene.

*Example III*

One thousand milliliters (1,000 ml.) of a reaction product, similar to that shown in Example 1, resulting from the interaction of hydrogen fluoride and methylacetylene and containing 30 percent 2,2-difluoropropane, 1 percent propadiene, 63.0 percent 2-fluoropropene, 6 percent methylacetylene and no hydrogen fluoride was added to a low temperature distillation flask containing 200 milliliters of ammonia. Upon low temperature distillation, an azeotrope containing 44.3 percent ammonia and 55.7 percent propadiene separates at —45 degrees centigrade. Continuing the distillation, a second azeotrope containing 66 percent 2-fluoropropene and 34 percent ammonia separates at —40.8 degrees centigrade and a third azeotrope containing 25 percent methylacetylene and 75 percent ammonia separates at —35 degrees centigrade. The remaining 2,2-difluoropropane, boiling at —0.5 degree centigrade remains with any excess ammonia and this can readily be recycled to the original reaction.

Each of the separated azeotropes when allowed to stand forms two layers at temperatures below the azeotrope boiling point, the propadiene azeotrope forming an upper layer containing 13 percent propadiene and 87 percent ammonia and a lower layer containing 55 percent ammonia and 45 percent propadiene. The 2-fluoropropene also forms 2 layers, an upper layer containing 88 percent ammonia and 12 percent 2-fluoropropene, and a lower layer containing 5 percent ammonia and 95 percent 2-fluoropropene.

While the lower layer containing 95 percent 2-fluoropropene is a relatively pure product, it is possible to distill this product and thereby form the azeotrope to the limit of the amount of ammonia present. When the ammonia has been eliminated, substantially pure 2-fluoropropene will remain. At the same time, the upper layer from the 2-fluoropropene azeotrope can be returned to the distillation mixture, thereby obtaining recycling of the ammonia. The propadiene azeotrope lower layer may be redistilled to separate a substantially pure propadiene which is utilized as a by-product, and the ammonia layer returned to the fractional distillation unit.

It is therefore seen that the process of the present invention provides a relatively simple and economical method of separating 2-fluoropropene and propadiene from a reaction mixture containing the same, whereby the only products are propadiene and 2-fluoropropene, while the remaining organic products are recycled for future reaction and the ammonia may be completely recycled for the distillation.

The compound 2-fluoropropene causes anesthesia in rats at proper concentrations and shows no evidence of toxicity at these concentrations. Because of the low degree of toxicity and the low boiling point, the compound also has utility as an aerosol propellant for lacquers and similar materials.

Various modifications may be made in the method of the present invention without departing from the spirit or scope thereof, and it is to be understood that we limit ourselves only as defined in the appended claims.

What is claimed is:

1. The process which comprises mixing ammonia with a mixture of methylacetylene, propadiene, 2-fluoropropene and 2,2-difluoropropane, and distilling the resulting mixture to separately remove the azeotropes therefrom.

2. The process which comprises mixing ammonia with a mixture of methylacetylene, propadiene, 2-fluoropropene, and 2,2-difluoropropane, distilling the resulting mixture to separately remove the azeotropes therefrom including an azeotrope of 2-fluoropropene and ammonia, condensing and settling the separated 2-fluoropropene azeotrope and, separating the resulting layers from said azeotrope.

3. The process which comprises adding ammonia to a mixture containing 2-fluoropropene and distilling the resulting product to separate an azeotrope containing 2-fluoropropene.

4. The process which comprises distilling a mixture of 2-fluoropropene and ammonia, condensing and settling the distillate and, separating the resulting layers from the condensed distillate.

5. The process which comprises mixing ammonia and 2-fluoropropene, and, distilling a mixture containing 34 weight percent ammonia and 66 weight percent 2-fluoropropene.

6. The process which comprises distilling a mixture of 2-fluoropropene and ammonia at a temperature above −41 degrees centigrade and at atmospheric pressure, condensing the distillate at a temperature below −41 degrees centigrade and at atmospheric pressure, and, separating the resulting layers from the condensed distillate.

7. The process which comprises mixing ammonia and 2-fluoropropene, and, distilling, at a temperature above −41 degrees centigrade and at atmospheric pressure, a mixture containing 34 weight percent ammonia and 66 weight percent 2-fluoropropene.

8. In a process for the production of 2-fluoropropene by reacting HF and methylacetylene to produce a reaction mixture containing 2-fluoropropene, 2,2-difluoropropane, propadiene and methylacetylene, including the steps of separating 2-fluoropropene and propadiene from such mixture which comprises adding to such mixture an amount of $NH_3$, at least sufficient to form azeotropes with the 2-fluoropropene and propadiene at about −41 degrees centigrade and −45 degrees centigrade, respectively, distilling the mixture first at −45 degrees centigrade and then at −41 degrees centigrade to recover separate azeotropes of ammonia and propadiene and ammonia and 2-fluoropropene, holding these azeotropes at temperatures below distilling temperature until two layers are formed, separating the two layers, recycling the upper layers to additional reaction mixture, and recovering propadiene and 2-fluoropropene from the respective lower layers.

References Cited in the file of this patent

Horsley: "Azeotropic Data," American Chemical Society, Washington, D. C. (1952), page 13.